UNITED STATES PATENT OFFICE.

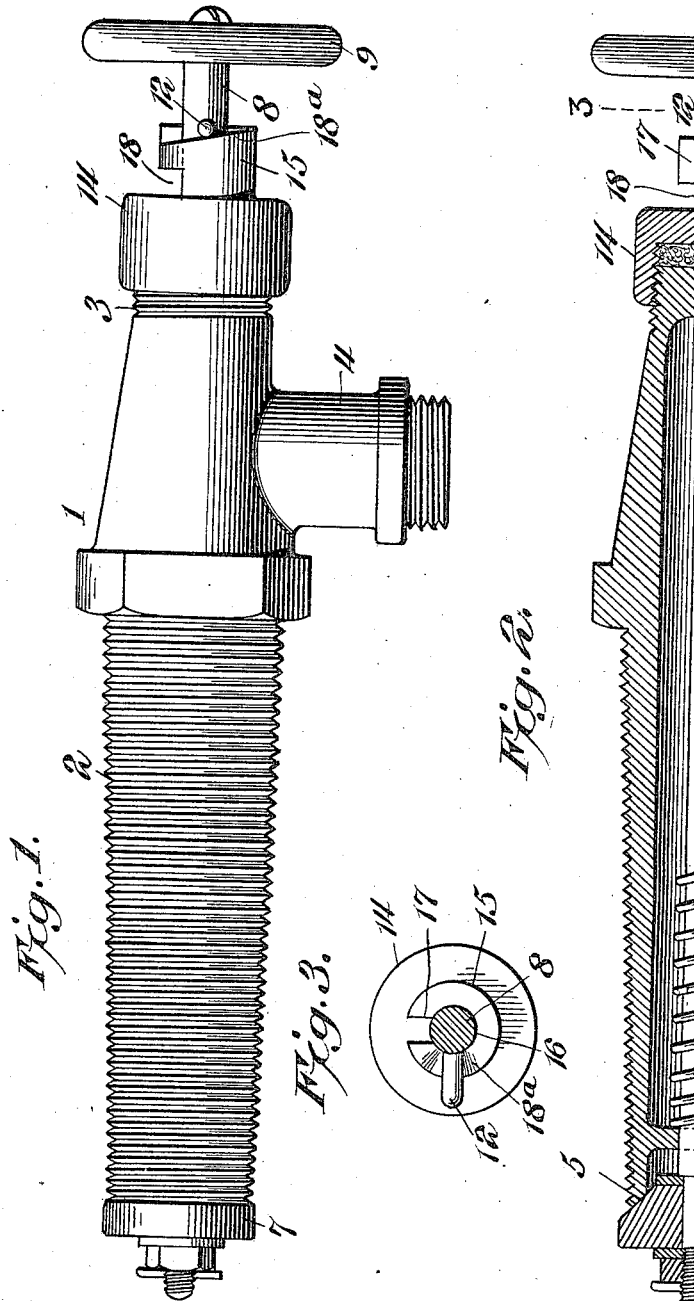
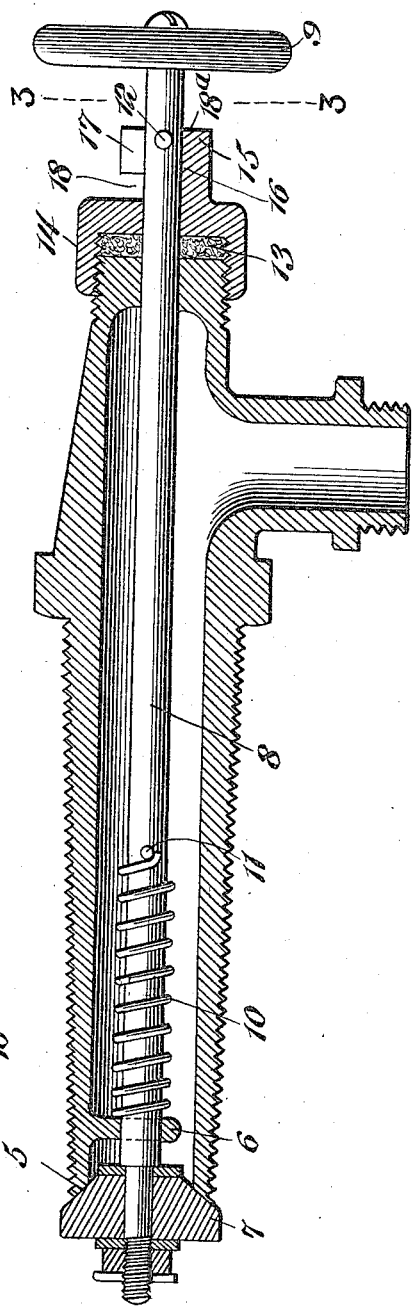
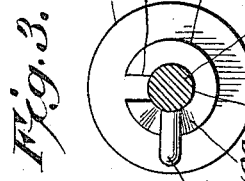

WILLIAM JOSEPH THOMAN, OF SHREVEPORT, LOUISIANA.

FAUCET.

1,059,953.         Specification of Letters Patent.       Patented Apr. 22, 1913.

Application filed May 14, 1912. Serial No. 697,249.

*To all whom it may concern:*

Be it known that I, WILLIAM JOSEPH THOMAN, citizen of the United States, residing at Shreveport, in the parish of Caddo and State of Louisiana, have invented new and useful Improvements in Faucets, of which the following is a specification.

My present invention pertains to faucets such as are designed particularly for use in combination with cisterns; and it has for its object to provide a faucet embodying a peculiar and advantageous construction whereby it can be so adjusted and adjustably fixed as to preclude freezing thereof. The said faucet is adapted to be locked in a closed position as well as in an open position; and it will be understood in all of its details from the following description and claims when the same are read in connection with the drawings, accompanying and forming part of this specification, in which:

Figure 1 is a side elevation of a cistern faucet constructed in accordance with my invention. Fig. 2 is a view, partly in longitudinal section and partly in elevation, of the same. Fig. 3 is a transverse detail section taken in the plane indicated by the line 3—3 of Fig. 2, and showing the arrangement of the stop finger on the valve stem relative to the bifurcated projection on the cap or gland of the faucet body when the valve body is secured in closed position.

Similar reference numerals designate corresponding parts in all of the views of the drawings.

In the present and preferred embodiment of my invention, the faucet body or casing 1 is exteriorly threaded at 2 and 3, and is provided with a spout 4, an inwardly beveled valve seat 5 and an interior apertured guide 6. Opposed to the seat 5 is a beveled valve body 7, suitably secured on a stem 8 that extends through the guide 6, and is equipped at its outer end with a conventional or any other suitable handle 9.

With a view to assuring closing of the valve body 7 against the seat 5 when the handle 9 is released by a person, I preferably, though not necessarily, employ the coiled expansion spring 10, Fig. 2. The said spring surrounds the stem 8 and is interposed between the guide 6 and an abutment 11 on the stem. It will also be observed that the stem 8 is provided at 12 with a stop in the form of a lateral finger.

Mounted on the outer threaded end 3 of the casing 2 and adapted to hold packing 13 against the said end is an apertured gland 14. The said gland 14 is provided on its outer side with a projection 15 in which is an aperture 16 alined with the aperture in the gland, and adapted in common therewith to receive and guide the stem 8. It will also be observed that the projection 15 is bifurcated, as indicated by 17, and that a space 18 is provided intermediate the bifurcated portion of the projection and the opposed end of the gland 14.

The spring 10 is preferably employed for the purpose of automatically closing the faucet when the hand wheel or handle is placed in the proper position. Otherwise one might turn the handle to the proper position and forgetting to pull outward on the handle, the faucet would leak.

The outer end of the projection 15 is cam-shaped, as indicated by $18^a$, in Fig. 1, and hence it will be manifest that when the valve body is moved to close the same against the seat 5, and the stop finger 12 is drawn outward through the bifurcation 17, the valve body can be tightly drawn and secured against the seat 5 by simply turning the stem 8 about its axis and toward the left in Fig. 3, so as to move the stop finger against the cam end $18^a$ of the projection 15. When the valve body 7 is thus drawn and tightly secured against the valve seat 5, freezing of the faucet is effectually prevented and the liability of stock opening the faucet is precluded.

When it is desired for any reason to lock the valve body 7 in open position, the stop finger 12 can be positioned between the bifurcated portion of the projection 15 and the outer end of the gland 14, and at an angle to the bifurcation 17.

It will be gathered from the foregoing that by reason of the bifurcation being provided in the lateral portion at the outer end of the longitudinal projection, the valve body can be locked in open position and can also be locked in closed position; and it will further be observed that subsequently to the locking of the valve body in the closed position, the valve body can be tightened against its seat to the extent necessary to take up wear and assure effectual and complete closure of the faucet.

The spout 4 of the casing 2 may be of any description without affecting my invention. I prefer, however, to use a spout such as shown, which is threaded and can therefore be used for the connection of a pipe or other conduit to carry water into a house or to any other point of use.

Having described my invention, what I claim and desire to secure by Letters-Patent, is:

1. The combination of a casing having a valve seat at its inner end and an outlet at an intermediate point of its length and also having an opening in its outer end for the passage of a valve stem and a longitudinal projection extending outwardly from said end; the outer end of the said projection being shaped to form a cam, and a lateral bifurcated portion being provided at the outer end of the longitudinal projection and said lateral portion being spaced from the outer apertured end of the casing, an exterior valve body opposed to the valve seat of the casing, and a valve stem connected with said body and extending through the casing and the aperture in the outer end thereof and also through the said longitudinal projection and having a lateral stop movable through the bifurcation in the lateral portion on the longitudinal projection and adapted when the stem is turned about its axis to be moved against the said cam.

2. The combination of a casing having a valve seat and an outlet and an exteriorly threaded outer end, a gland screwed on said end and having packing opposed to the end and also having a projection on which is a bifurcated portion spaced from the outer end of the gland and further having the outer end of the projection shaped to form a cam, a valve body opposed to the valve seat, a valve stem connected with said body and extending through the casing and the gland and the projection on the gland and having a lateral stop adapted to be moved through the bifurcation and also adapted when the stem is turned about its axis to be moved against said cam, and a coiled spring surrounding the stem and interposed between a fixed abutment in the casing and an abutment on the stem.

In testimony whereof I have hereunto set my hand in presence of two subscribing witnesses.

WILLIAM JOSEPH THOMAN.

Witnesses:
J. B. SLATTERY,
P. M. WELSH.

---

Copies of this patent may be obtained for five cents each, by addressing the "Commissioner of Patents, Washington, D. C."